Oct. 3, 1967     J. W. SCHUCK     3,344,668
CONTROL APPARATUS
Filed July 30, 1964
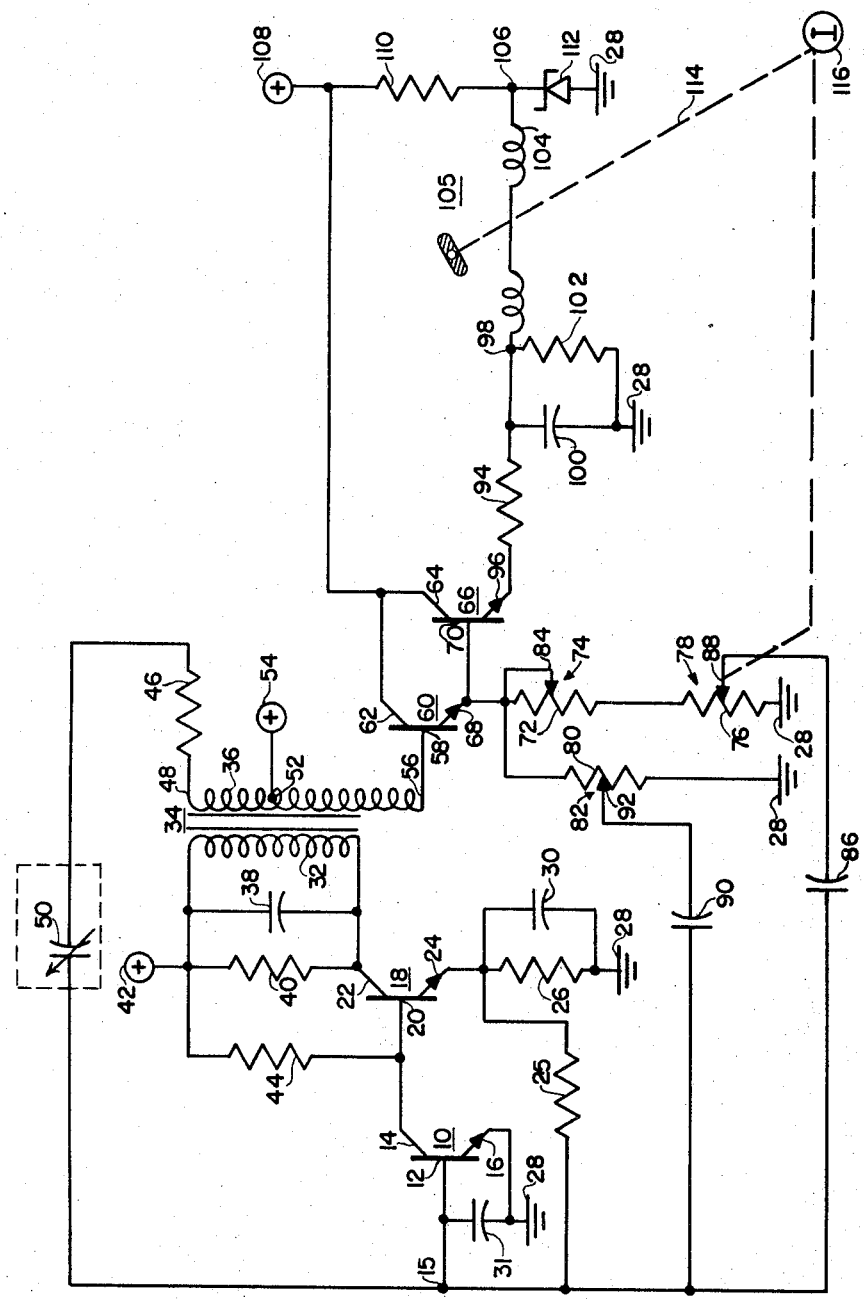
INVENTOR.
JACK W. SCHUCK
BY
*Bruce C. Lutz*
ATTORNEY United States Patent Office 3,344,668
Patented Oct. 3, 1967

3,344,668
CONTROL APPARATUS
Jack W. Schuck, Hopkins, Minn., assignor to Honeywell Inc., Minneapolis, Minn., a corporation of Delaware
Filed July 30, 1964, Ser. No. 386,307
9 Claims. (Cl. 73—304)

This invention pertains generally to condition sensors and more particularly to fluid level sensors.

There has long been a need for a relatively cheap level sensor and while some cheap level sensors have been disclosed to the public in the past, these cheaper sensors were not particularly accurate embodiments. The present invention, however, provides relative cheapness while still providing high accuracy. Although the invention can be practiced in different forms as will be later explained, the single embodiment shown utilizes a variable amplitude oscillator which has both positive and negative feedback loops. The positive feedback loop contains a level sensing capacitor which is mounted in a tank while the negative feedback loop contains another capacitor. The output from the oscillator drives a motor means which will provide an indication and adjust the voltage on the negative feedback loop so that the oscillator always tends to return toward a predetermined amplitude of oscillation. The circuitry is arranged so that the positive feedback is always more than the negative feedback to sustain oscillation and one of the feedback signals is altered so as to maintain the amplitude of oscillation at a substantially constant value.

An object of the invention is to provide an improved condition sensing apparatus. Other objects and advantages of this invention will be ascertained from a reading of the specification and appended claims in conjunction with the single figure which illustrates one embodiment of the invention.

In the single figure an NPN transistor, valve, switching means, or amplifying means 10 has a base or input 12 and a first output or collector 14 along with a second output or emitter 16. This transistor is part of an oscillator circuit and an input terminal 15 of the oscillator is connected to base 12 of transistor 10. A second NPN transistor, valve, switching means, or amplifying means 18 has a base or input 20 connected to collector 14 and has a collector 22 along with an emitter 24. The emitter 24 is connected to input 15 through a resistor 25. A resistor 26 is connected between emitter 24 and ground or reference potential 28. A capacitor 30 is connected in parallel with resistor 26 between emitter 24 and ground 28. Another capacitor 31 is connected between input 15 and emitter 16 of transistor 10. Emitter 16 is further connected to ground 28. Collector 22 of transistor 18 is connected to one end of a primary winding 32 of a transformer generally designated as 34 which has a secondary winding 36. A capacitor 38 and a resistor 40 are connected in parallel between the ends of primary winding 32. The end of primary winding 32 which is not connected to collector 22 is connected to a positive power source 42. A resistor 44 is connected between positive power source 42 and collector 14 of transistor 10. A resistor 46 is connected between a first end 48 of secondary winding 36 and one electrode of a condition sensitive element or a capacitor 50. The other end of capacitor 50 is connected to input 15 of the oscillator. The capacitor 50 in this particular embodiment is the tank unit or condition sensing means which for other condition sensing applications would not necessarily be a capacitor. The secondary winding 36 has a tap 52 which is connected to a second positive power terminal 54. Normally this positive power terminal will be of a different voltage than is supplied by terminal 42 although alternations can be made so as to allow connection of these two points to a common supply. A second end 56 of secondary winding 36 is connected to a base 58 of an amplifying means, valve means, switching means or NPN transistor means generally designated as 60. A collector 62 of transistor 60 is connected to a collector 64 of an amplifying means, switching means, valve means, or NPN transistor means generally designated as 66. An emitter 68 of transistor 60 is connected to a base 70 of transistor 66. A resistance element 72 of a first potentiometer 74 is connected in series with a second resistance element 76 of a potentiometer generally designated as 78 between emitter 68 and ground 28. A third resistance element 80 of a potentiometer generally designated as 82 is connected in parallel with the two potentiometers 74 and 78. A wiper 84 of potentiometer 74 is connected between a wiper 88 of potentiometer 78 and the input 15. Potentiometer 78 is part of the rebalance means and the wiper 88 may also be referred to as a variable input means or mechanical input means for varying the output signal. The capacitive means 90 is connected between a wiper 92 of potentiometer 82 and input 15 of the oscillator. A resistive element 94 is connected between an emitter 96 of transistor 66 and a junction point 98. A capacitor 100 is connected in parallel with a resistive element 102 between junction point 98 and ground 28. A winding 104 of a motor means, voltage sensitive means, or meter movement means 105 is connected between junction point 98 and a junction point 106. Collector 64 of transistor 66 is connected to a third positive power terminal means 108 which may be of the same potential as applied to power terminal 42. A resistive element 110 is connected between positive power terminal 108 and junction point 106. A Zener diode means, reference means, or voltage dropping means 112 is connected between junction point 106 and ground 28 such that the direction of easy current flow through diode 112 is toward junction point 106. A mechanical connection from motor means 104, shown as dashed line 114, is attached to wiper 88 of potentiometer 78 and also to an indicator 116. If the winding 104 is part of a meter movement as shown the indicator 116 will be an integral part of the motor means although it is not necessary that this be so. The wiper 88 of potentiometer 78 constitutes a rebalance means and varies in position and therefore in output voltage in accordance with movements of the mechanical linkage 114 in response to changes of applied voltage across winding 104.

In operation, the transistors 10 and 18 along with the transformer 36 and its tuned circuit including parallel capacitor 38 and the positive feedback capacitor 50 constitutes a standard oscillator type circuit. Without the rest of the circuitry, the oscillator will saturate and produce a maximum amplitude output. The transistor 60 provides a low impedance output which is fed back through the two capacitors 90 and 86. The current through capacitor 90 is of opposite phase but approximately equal amplitude as compared to current through capacitor 50 in its empty condition so as to cancel out the effect of this capacitance. The wiper 92 is adjusted so that there is a zero indication when there is no fluid between the electrodes of tank unit or capacitor 50. The capacitor 86 for some applications will be mounted in the fluid sensing tank and will be covered with fluid under all conditions. The current or signal through this capacitor will also be of a phase opposite the current through capacitor 50. Thus a signal through capacitor 86 will constitute a negative feedback signal. If the combined signals through capacitor 86 and 90 equal the total signal through capacitor 50, there will be no oscillation. However, it is desirable to keep the oscillating around a predetermined amplitude so as to be able to both lower and raise the voltage applied to the motor means 105. The voltage applied to terminal 54 is also applied through the base emitter junctions of transistors 60 and 66 to junction point 98 so that the voltage at junction point 98 is lower than the voltage applied to terminal 54 by an amount equal to the voltage drops in the two transistors and the voltage drop due to current flow through resistor 94. This voltage is modified by the half-wave signals of alternating current which are amplified after being rectified due to the biasing scheme of transistor 66. In other words, transistor 66 will only pass the positive and not the negative half-cycles of the incoming signal. These positive half-cycles will be filtered through the combination of resistance element 94 and capacitor 100 so as to somewhat raise the voltage at junction point 98 above what is obtained from the power terminal 54. This voltage can be determined from operation of the oscillator at its desirable amplitude of oscillations. A voltage divider network comprising resistor 110 and Zener idode 112 can then be utilized to provide a reference voltage at junction point 106 which is equal to this predetermined or set voltage at junction point 98. Under these conditions, motor means 105 will remain inactive and there will be no adjustment of wiper 86 or indicator 116. If the level of the fluid in the tank rises so as to increase the capacitance of capacitor 50 and therefore increase the positive feedback current, the amplitude of oscillations, the voltage at junction point 98 will also rise and cause motor means 105 to adjust the wiper 88 of potentiometer 78 so as to increase the amount of negative feedback signal to thereby bring the amplitude of oscillations back toward the original value. If the level of the fluid lowers to decrease the capacitance of capacitor 50, the wiper 88 will be moved in the opposite direction to decrease the amount of negative feedback and therefore raise the amplitude of oscillations toward the original value.

While the invention thus far as has been described as using a meter movement for motor means 105, it will be realized by those skilled in the art that a more conventional motor may be used for motor means 105 which will drive indicator 116 and also the wiper 88 of potentiometer 78. It will also be realized by those skilled in the art that although a direct voltage motor means has been utilized, that an alternating form of motor means may be utilized if an alternating reference is applied at junction point 106 rather than the direct voltage as shown. Further, it is to be realized that a solid state form of rebalance means can be utilized which will take the voltage output from emitter 68 of transistor 60 and utilize this information for a readout and also to adjust the voltage applied to capacitor 86 in somewhat the same form as shown in a Valentine application, Ser. No. 320,816, filed Nov. 1, 1963, now Patent No. 3,237,178, and assigned to the same assignee as the present invention.

While this invention has been described in a manner to simplify understanding of the invention, it is to be further realized that the invention is not to be limited by the specification, or the single embodiment shown but only by the appended claims in which I claim:

1. Liquid level measuring apparatus comprising, in combination:
   capacitive tank unit means for insertion in a container of a liquid the quantity of which is to be measured;
   oscillator means having input means and first, second and third output means, said first and second output means supplying first and second opposite phase output signals to be used respectively for positive and negative feedback around said oscillator means;
   means connecting said tank unit between said first output means and said input means of said oscillator means, the amplitude of the positive feedback signal being dependent upon the quantity of liquid between the electrodes of said tank unit means;
   variable feedback means connected between said second output means and said input means of said oscillator means for supplying a negative feedback signal thereto, said variable feedback means including input means for varying the amplitude of said negative feedback signal;
   demodulator means, including output means, connected to said third output means of said oscillator means for receiving a third output signal therefrom, said demodulator means providing a fourth output signal at said output means of said demodulator means which is amplitude dependent upon the signal received from said oscillator means;
   reference signal supplying means for supplying a reference signal;
   motive means, including mechanical output means, connected between said voltage reference means and said output means of said demodulator means, said motive means supplying an output at said mechanical output means when more than a predetermined voltage differential occurs between said fourth output signal and said reference signal;
   indicator means for providing an output indicative of liquid level; and
   means connecting said mechanical output means of said motive means to said indicator means for providing an output indication and to said input means of said variable feedback means to alter the amplitude of oscillation of said oscillator means toward a predetermined level by varying the negative feedback signal.

2. Liquid level measuring apparatus comprising, in combination:
   capacitive tank unit means for insertion in a container of a liquid to be measured;
   oscillator means having input means and first, second and third output means, said first and second output means supplying first and second opposite phase output signals to be used respectively for positive and negative feedback around said oscillator means;
   means connecting said tank unit between said first output means and said input means of said oscillator means;
   variable feedback means connected between said second output and said input means of said oscillator means for supplying a negative feedback signal thereto, said variable feedback means including input means for varying the amplitude of said negative feedback signal;
   demodulator means, including output means, connected to said third output means of said oscillator means for receiving a third output signal therefrom, said demodulator means providing a fourth output signal at said output means of said demodulator means;
   reference signal supplying means for supplying a reference signal;
   motor means including mechanical output means, connected between said voltage reference means and said output means of said demodulator means, said motor means supplying an output at said mechanical output means when more than a predetermined voltage differential occurs between said fourth output signal and said reference signal;
   indicator means for providing an output indicative of liquid level; and
   means connecting said mechanical output means of said motor means to said indicator means for providing an output indication and to said input means of said variable feedback means to alter the amplitude of oscillation of said oscillator means toward a predetermined level by varying the amplitude of the negative feedback signal.

3. Fluid quantity measuring apparatus comprising, in combination:
   capacitive tank unit means for insertion in a container of a fluid to be measured;
   oscillator means having input means and first, and second output means, said first and second output means supplying first and second opposite phase output signals to be used respectively for positive and negative feedback around said oscillator means;
means connecting said tank unit between said first output means and said input means of said oscillator means, the amplitude of the positive feedback signal being dependent upon the quantity of fluid between the electrodes of said tank unit means;
variable feedback means connected between said second output means and said input means of said oscillator means for supplying a negative feedback signal thereto, said variable feedback means including input means for varying the amplitude of said negative feedback signal;
demodulator means, including output means, connected to one of said output means of said oscillator means for receiving an output signal therefrom, said demodulator means providing a third output signal at said output means of said demodulator means;
reference signal supplying means for supplying a reference signal;
rebalance means including output means, connected between said voltage reference means and said output means of said demodulator means, said rebalance means supplying an output at its output means when more than a predetermined voltage differential occurs between said third output signal and said reference signal;
indicator means for providing an output indicative of fluid level; and
means connecting said output means of said rebalance means to said indicator means for providing an output indication and to said input means of said variable feedback means to alter the amplitude of oscillation of said oscillator means toward a predetermined level by varying the amplitude of the negative feedback signal.

4. Apparatus of the class described comprising, in combination:
tank unit means for insertion in a container of fluid to be measured;
oscillator means having input and output means, said output means supplying opposite phase output signals to be used respectively for positive and negative feedback around said oscillator means;
means connecting said tank unit between said output means and said input means of said oscillator means for transmitting a feedback signal of one phase to said input means;
variable feedback means connected between said output means and input means of said oscillator means for supplying a feedback signal of the opposite phase thereto, said variable feedback means including input means for varying the amplitude of said feedback signal;
demodulator means, including output means, connected to said output means of said oscillator means for receiving an output signal therefrom, said demodulator means providing an output signal at said output means of said demodulator means, the amplitude of said demodulator output signal varying around a predetermined value;
rebalance means including output means, connected to said output means of said demodulator means, said rebalance means supplying an output at its output means when more than a predetermined signal variation occurs from said predetermined value;
indicator means; and
means connecting said output means of said rebalance means to said indicator means for providing an output indication and to said input means of said variable feedback means to alter the amplitude of oscillation of said oscillator mans toward a predetermined level by varying the amplitude of the feedback signal.

5. Fuel quantity apparatus comprising, in combination:
transistor amplifier means including input means and output means, said amplifier means oscillating upon the application of a required amount of positive feedback to said input means;
phase splitting means connected to said amplifier output means for receiving a signal therefrom, said phase splitting means including first and second output means for supplying first and second opposite phase output signals;
capacitive tank unit means connected between said first output means of said phase splitting means and said input means of said amplifier means for supplying positive feedback thereto;
empty adjustment means connected to said second output of said amplifier phase splitting means for supplying a signal to the input means of said amplifier of a phase to cancel the effect of any signals supplied by said tank unit means in an empty condition;
rebalance means connected between said second output means of said phase splitting means and said input means of said amplifier, said rebalance means supplying a feedback signal to said amplifier means of a phase opposite that supplied by said tank unit means and of a variable amplitude such that the positive feedback signal remains larger than any negative feedback signals applied to said input means of said amplifier means; and
indicator means connected to the second output means of said phase splitting means and to said rebalance means for adjusting the amplitude of the feedback signal supplied through said rebalance means toward a value to keep the output from said amplifier means at a substantially constant value throughout the range of empty to full amounts of fuel between the electrodes of said capacitive tank unit means.

6. Fuel quantity apparatus comprising, in combination:
amplifier means including input means and output means, said amplifier oscillating upon the application of a substantial amount of positive feedback to said input means;
phase splitting means connected to said amplifier output means for receiving a signal therefrom, said phase splitting means including first and second output means for supplying first and second opposite phase signals;
capacitive sensing means connected between said first output means of said phase splitting means and said input means of said amplifier means;
empty adjustment means connected to said output means of said phase splitting means for supplying a signal to the input means of said amplifier means of a phase to cancel the effect of the signal supplied by said sensing means in an initial condition;
rebalance means connected between said second output means of said phase splitting means and said input means of said amplifier, said rebalance means supplying a feedback signal to said amplifier means of a phase opposite that supplied by said sensing means;
indicator means connected to the second output means of said phase splitting means and to said rebalance means for adjusting the amplitude of the feedback signal supplied through said rebalance means toward a value to keep the output from said amplifier means at a substantially constant value throughout the range of empty to full amounts of fuel between the electrodes of said capacitive tank unit means.

7. Fuel quantity apparatus comprising, in combination:
amplifier means including input means and output means, said amplifier means oscillating upon the application of positive feedback to said input means;
phase splitting means connected to said amplifier output means for receiving a signal therefrom, said phase splitting means including first and second output means for supplying first and second opposite phase output signals;

condition sensing means connected between said first output means of said phase splitting means and said input means of said amplifier means;

rebalance means connected between said second output means of said phase splitting means and said input means of said amplifier, said rebalance means supplying a feedback signal to said amplifier means of a phase opposite that supplied by said condition sensing means and of a variable amplitude such that the positive feedback signal remains larger than any negative feedback signals applied to said input means of said amplifier means; and indicator means connected to said rebalance means.

8. Condition sensing apparatus comprising, in combination:

amplifier means including input means and first and second output means, said amplifier means oscillating upon application of a predetermined excess of positive feedback as compared to negative feedback, said first output means providing an output signal of a given phase and said second output means providing an output signal of a phase substantially opposite said given phase;

condition sensitive sensor means connected between one of said output means of said amplifier means and said input means for supplying thereto a feedback signal indicative of one of said output signals;

variable impedance means connected between the other one of said output means of said amplifier means and said input means for supplying thereto a feedback signal of a phase substantially opposite that supplied by said condition sensitive sensor means, said variable impedance means including input means for varying the impedance thereof;

indicator means including input and output means, said indicator means providing an output when any signal applied to said input means of said indicator means deviates from a predetermined value;

means connecting said input means of said indicator means to one of said output means of said amplifier means; and means connecting said output means of said indicator means to said input means of said variable impedance means for adjusting the feedback signal supplied thereby toward an amount such that the signal returns toward the predetermined value.

9. Condition sensing apparatus comprising, in combination:

amplifier means including input means and first and second output means, said amplifying means oscillating upon application of an excess of positive feedback as compared to negative feedback, said first output means providing an output signal of a given phase and said second output means providing an output signal of a phase substantially opposite said given phase;

condition sensitive sensor means connected between one of said output means of said amplifier means and said input means for supplying thereto a first feedback signal;

variable means connected between the other end of said output means of said amplifier means and said input means for supplying thereto a second feedback signal of a phase substantially opposite the phase of said first feedback signal phase, said variable means including input means for varying amplitude of the second feedback signal;

indicator means including input and output means, said indicator means providing an output when any signal applied to said input means of said indicator means deviates from a predetermined value;

means connecting said input means of said indicator means to one of said output means of said amplifier means; and means connecting said output means of said indicator means to said input means of said variable means for adjusting said second feedback signal toward an amount such that the signal received by said indicator means returns toward the predetermined value.

References Cited

UNITED STATES PATENTS

| | | | |
|---|---|---|---|
| 2,354,964 | 8/1944 | Ostermann et al. | 73—304 X |
| 2,621,517 | 12/1952 | Sontheimer | 73—304 |
| 2,899,825 | 8/1959 | Adams et al. | 73—304 |
| 2,908,166 | 10/1959 | Johnson | 73—304 |
| 3,161,054 | 12/1964 | Cohn | 73—304 |
| 3,254,333 | 5/1966 | Baumoel | 73—304 |

LOUIS R. PRINCE, *Primary Examiner.*

F. SHOON, *Assistant Examiner.*